3,795,579
NUCLEAR FUEL ASSEMBLY COMPRISING A
SLEEVE OF VARIABLE THICKNESS
Jean-Claude Chenal, Karl Schaller, and Jean Skok, Aix-en-Provence, and Henri Venobre, Vinon-sur-Verdon, France, assignors to Commissariat a l'Energie Atomique
Filed Apr. 25, 1972, Ser. No. 247,361
Claims priority, application France, May 5, 1971, 7116155
Int. Cl. G21c 3/06
U.S. Cl. 176—78
4 Claims

ABSTRACT OF THE DISCLOSURE

The fuel assembly comprises at least one bundle of canned-fuel pins of substantial length which are disposed on a uniform lattice and enclosed within a sleeve through which the collant flows in a general direction parallel to the fuel pins. The thickness of the sleeve in the downstream portion is smaller than in the upstream portion as considered in the direction of coolant flow.

---

The invention permits a reduction in curvature of fuel assemblies as a result of buckling at high radiation rates, even in zones in which the radial flux gradient is of maximum value.

This invention relates to a nuclear fuel assembly of the type commonly employed in sodium-cooled fast reactors and comprising at least one bundle of pins of substantial length and formed of canned fuel, said pins being disposed in parallel relation on a uniform lattice, and a sleeve which is intended to carry a circulation of cooling fluid and to contain the fuel bundle. The pins which constitute the same bundle are usually supported by a grid which is rigidly fixed to the sleeve, and carries rails on which the fuel-pin end-caps are engaged. The minimum fuel-pin spacing over the entire length of the bundle is determined by coarse-pitch helical spacers carried by each fuel pin. The pins of one bundle are accordingly disposed on a uniform triangular lattice within a sleeve having a hexagonal transverse cross-section.

The fuel assemblies of the type hereinabove defined and designed to attain high burnup rates (at least 100,000 Mwj/t in reactors at present under design) must take into account the swelling of the sleeve under the action of radiation. If no counter-measures are taken, the result produced by this swelling of the sleeve is that the assemblies placed in a zone of the core in which the neutron flux exhibits a high gradient are subject to buckling in the shape of an arc or a banana as a result of differential elongation of the opposite faces of the hexagonal-section sleeve.

Arcuate buckling of the sleeve is attended by serious consequences, since this tends to reduce the cross-sectional area of some of the fuel-pin cooling sub-channels and to form hot spots. Buckling can also cause jamming of the fuel assemblies and makes it difficult to remove the assemblies at the time of fuel unloading. These consequences can clearly be expected with a greater degree of certainty as the fuel assembly is of greater length. In point of fact, the current trend in fuel assembly design in sodium-cooled fast reactors is to increase the length of assemblies which can thus attain several meters. Under these conditions, the fuel assembly must be designed in such manner as to ensure that distortion during reactor operation remains within acceptable limits.

In order to eliminate the problem, it might be considered sufficient to make use of fuel assemblies without an outer sleeve. However, this solution results in excessive cooling of the peripheral fuel pins along the clearance provided between two adjacent assemblies and in a very hazardous curvature of these pins which are liable to cause jamming of adjacent fuel assemblies unless the pins are positionally maintained by means of grids located in closely spaced relation in the axial direction. Moreover, in the event of melt-down of the fuel, this latter spreads more readily to a number of assemblies.

A further solution which immediately comes to mind consists in changing periodically the orientation and/or location of each fuel assembly in order that swelling of the sleeve should take place in a uniform manner but this solution cannot easily be applied in practice.

Consideration can also be given to the possibility of guarding against the phenomenon of arcuate distortion by giving the sleeve a sufficiently small thickness to ensure that flexibility of the sleeve is maintained and any distortion of this latter is therefore not liable to be accompanied by the fuel pins or, in other words, that the sleeve is maintained rectilineal by the fuel pins. Unfortunately, it is not possible to reduce the thickness of the sleeve assembly to a sufficiently small value to ensure that this latter remains flexible, at least in the case of assemblies of substantial length. In fact, the sleeve must afford resistance without distortion to the forces arising from the difference between the pressure exerted within the interior of the sleeve and the pressure which exists externally of this latter; inasmuch as this external pressure is practically equal to the pressure downstream of the fuel assembly, the difference between the internal pressure at a given level of the fuel assembly and the external pressure is substantially equal to the pressure drop to which the coolant is subjected between this level and the fuel assembly outlet. This pressure drop can attain a value of the order of 6 bars in sodium-cooled reactors which are at present under design. In this case, there is therefore no alternative other than to provide a thickness of sleeve such that this latter has insufficient flexibility.

The aim of this invention is to provide a nuclear fuel assembly which conforms to practical requirements more effectively than those proposed heretofore, especially insofar as said assembly largely results in a reduction of the curvature at high radiation rates, even in zones in which the radial flux gradient is of maximum value.

To this end, the invention proposes a nuclear fuel assembly comprising at least one bundle of canned-fuel pins of substantial length, said pins being disposed in parallel relation on a uniform lattice, and a sleeve which contains said bundle and through which a cooling fluid is intended to flow in a general direction parallel to the fuel pins, said fuel assembly being characterized in that the thickness of the sleeve in the downstream portion thereof as considered in the direction of coolant flow is smaller than in the upstream portion thereof.

In practice, the maximum thickness of the sleeve (that is to say the thickness of the sleeve in that portion which is located farthest upstream) will be chosen so that said sleeve should afford resistance to the differential pressure during operation without any appreciable distortion whereas the thickness in the downstream portion will be chosen so that the sleeve should afford resistance to tensile and compressive stresses at the time of handling of the fuel assembly. In fact, compliance with this condition will usually correspond in the downstream portion to a thickness exceeding the value which enables the sleeve to withstand the difference between the internal pressure and the external pressure.

In the most frequent case, namely the case of a fuel assembly through which the coolant is circulated in the upward direction, the bottom portion of the sleeve which is secured to the assembly end-fitting will have the greatest thickness.

In the case of a fuel assembly consisting of a lower bundle of pins containing fissile material and an upper bundle containing fertile material alone, provision will advantageously be made for a change in thickness within the intermediate zone located between the fissile bundle and the fertile bundle.

A better understanding of the invention will be obtained from the following description in which a fuel assembly constituting one mode of application of the invention and alternative embodiments are given by way of non-limiting examples, reference being made to the accompanying drawings, wherein.

Figure 1:
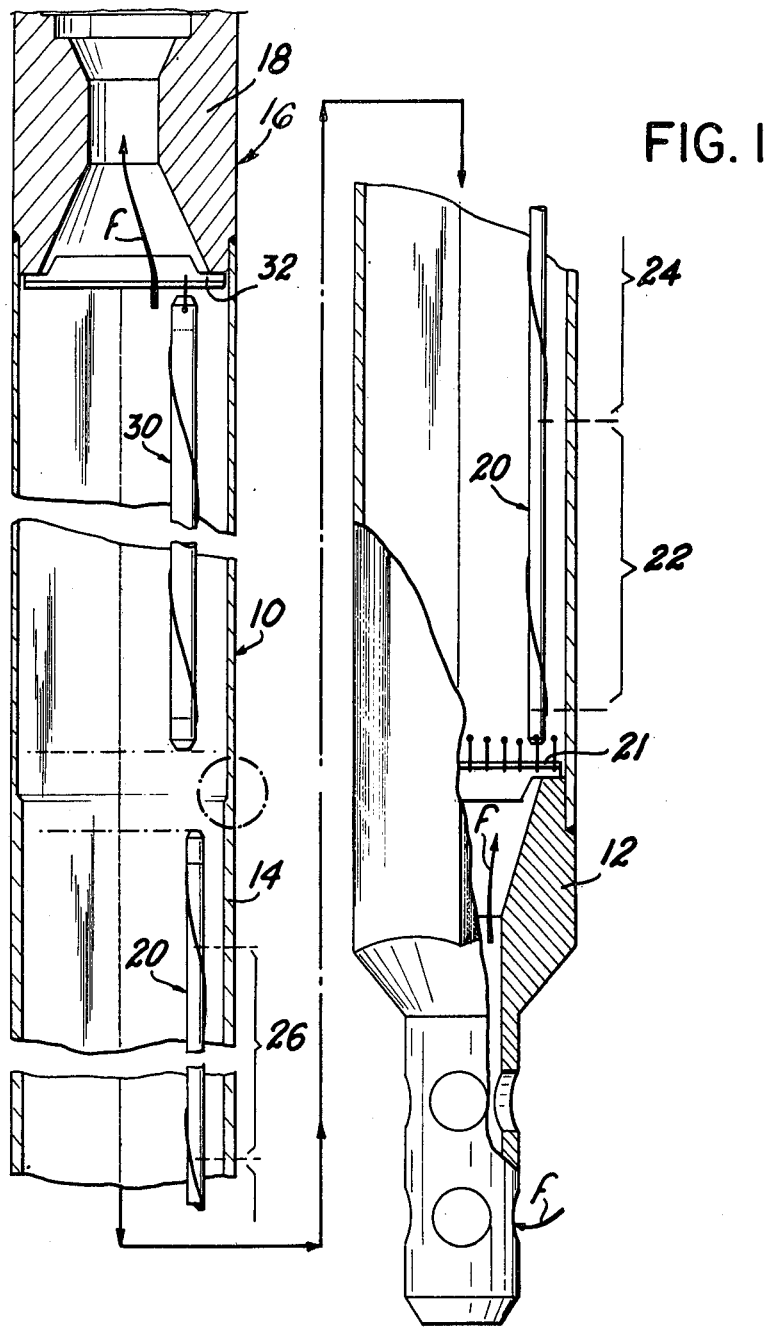
FIG. 1 shows diagrammatically a fuel assembly consisting of two superposed bundles, this view being taken in section along the vertical mid-plane of the assembly.

FIG. 1 shows one of the fuel assemblies 10 which are intended to be juxtaposed so as to constitute the core of a fast reactor of the type which is cooled by an upward flow of liquid sodium in the direction of the arrows $f$. The fuel assembly 10 is provided with a bottom end-fitting 12 which engages within a reactor-core support grid (not shown). Each fuel assembly is delimited by a sleeve 14 having a hexagonal transverse cross-section and constituting a duct for the circulation of sodium, said sleeve being secured to the bottom end-fitting 12 and to a handling head 16. The interior of the head 16 is filled with an annular packing 18 of neutron-absorbing material; the juxtaposition of annular packings 18 constitutes a top neutron shield of the reactor core. The external face of the sleeve 14 is smooth and has a constant transverse cross-section throughout its length.

The fuel assembly which is illustrated in FIG. 1 consists of two superposed bundles of fuel pins. The pins 20 of the lower bundle which are carried by a grid 21 secured to the bottom end-fitting 12 are of the so-called "integrated" type. The cladding tube of each fuel pin 20 contains successively from the bottom upwards, that is to say in the direction of flow of the coolant, a fission-gas collection chamber which occupies the zone 22, a stack of pellets of fertile material (depleted uranium oxide, for example) which occupies the zone 24, a stack of pellets of fissile material (mixed oxide of uranium and plutonium, for example) which occupies the zone 26 and finally a space which permits upward expansion of the stack of pellets of fissile material and can contain a spring for maintaining the stack of fissile pellets in position.

The pins 30 of the upper bundle which are suspended from a grid 32 contain pellets of fertile material and usually have a larger diameter than the pins 20 since they generate a smaller quantity of heat.

Figure 2:
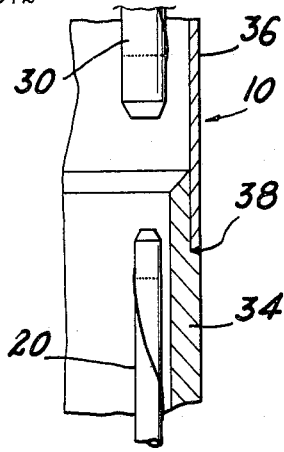
FIG. 2 is a large-scale view of the portion of fuel assembly which is shown within the chain-dotted line circle of FIG. 1.

The sleeve of the fuel assembly which is illustrated in FIGS. 1 and 2 is constituted by two sections which are secured to each other. The lower section 34 has a constant thickness which is sufficient to afford resistance without any appreciable distortion to the difference between the pressure at which the coolant is admitted into the fuel assembly and the external pressure. In view of the fact that all the fuel assemblies in one reactor should preferably be interchangeable, this thickness will be chosen in practice so as to correspond to the maximum design inlet pressure in any given reactor. This lower section 34 extends from the bottom end-fitting 12 to which it is attached by welding, up to the intermediate zone between the lower bundle and the upper bundle of fuel pins.

The upper section 36 connects the lower section to the head 16 and has a distinctly smaller thickness than that of the section 34, thereby endowing it with a certain degree of flexibility. This upper section 36 extends from the lower section 34 up to the head 16. In the embodiment which is illustrated in FIG. 2, said section is secured by welding at 38 to a shouldered portion of the lower section 34 in order that the external face of the sleeve should remain flat.

By way of example, it can be mentioned that a fuel assembly of the type hereinabove described and having a length of 4.30 m. has been constructed for a fast reactor of the type cooled by circulation of liquid sodium. The maximum pressure of admission into the fuel assemblies was of the order of 6 bars. Under these conditions, the lower section 34 had a thickness of 3.5 mm. whilst the upper section had a thickness of 1 mm.

Figure 3:
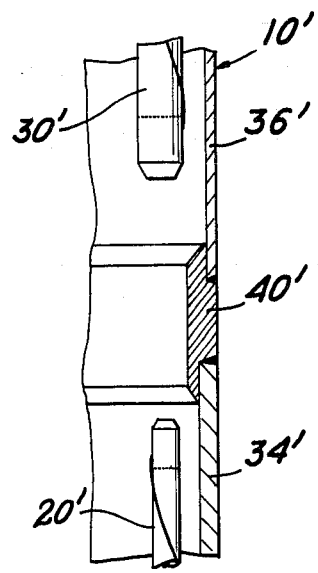
FIG. 3 is a large-scale view which is similar to FIG. 2 and shows an alternative form of construction of the sleeve.

The embodiment which is illustrated in FIG. 2 entails as a practical requirement that the sections should be welded at 38 by the electron beam welding process. In point of fact, arc welding would result in different heating of the two sections and could give rise to a defective joint. In order to render the heating more uniform and to permit arc welding, the upper section 36' can be joined to the lower section 34' by means of an intermediate sleeve 40 (FIG. 3) which is arc-welded to the two sections 34' and 36'.

The invention is clearly not limited solely to the embodiments which have been described by way of example with reference to the drawings and it must be understood that the scope of this patent extends to alternative forms of either all or part of the arrangement herein described which remain within the definition of equivalent means. From this it follows that the sleeve 14 need not have a constant external transverse cross-section over its entire length but could have a constant transverse cross-section throughout its length as this permits uniform flow of the sodium within the interior of the fuel assembly.

What we claim is:

1. A nuclear fuel assembly for a fast reactor consisting of at least two bundles of canned-fuel pins of substantial length, said pins being disposed in paarllel relation on a uniform lattice, and a sleeve containing said bundles and through which a cooling fluid flows in a general direction parallel to the fuel pins, the thickness of said sleeve in the downstream portion thereof in the direction of cooling fluid flow is smaller than in the upstream portion thereof, said sleeve having a constant external transverse cross-section, the cooling fluid flowing in the upward direction, the bottom portion of said sleeve being thicker than the top portion resisting the pressure of said cooling fluid without distortion, said bundles of pins including a bundle of pins containing only fissile material and a bundle of pins containing only fertile material, said sleeve having a first constant thickness from one end up to an intermediate zone between said fissile bundle and said fertile bundle and a second constant thickness beyond said zone.

2. A fuel assembly according to claim 1, said sleeve having a plurality of sections, each of said sections having a constant thickness and interassembled by welded joints.

3. A fuel assembly according to claim 1, said sleeve having a plurality of sections each having a constant thickness, said sections being interassembled by sleeves.

4. A fuel assembly according to claim 1, said sleeve being one piece.

References Cited
UNITED STATES PATENTS

| | | | |
|---|---|---|---|
| 3,134,722 | 5/1964 | Hespel et al. | 176—40 |
| 3,274,070 | 9/1966 | Vanslager | 176—76 |
| 3,378,452 | 4/1968 | Costes | 176—78 |
| 3,574,058 | 4/1971 | Gumuchian | 176—78 |

CARL D. QUARFORTH, Primary Examiner

E. E. LEHMANN, Assistant Examiner

U.S. Cl. X.R.

176—40